US010162041B2

United States Patent
Taketomi

(10) Patent No.: US 10,162,041 B2
(45) Date of Patent: Dec. 25, 2018

(54) MEASUREMENT SYSTEM USING TRACKING-TYPE LASER INTERFEROMETER AND RETURN METHOD OF THE MEASUREMENT SYSTEM

(71) Applicant: MITUTOYO CORPORATION, Kanagawa (JP)

(72) Inventor: Naoyuki Taketomi, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 25 days.

(21) Appl. No.: 15/095,418

(22) Filed: Apr. 11, 2016

(65) Prior Publication Data

US 2016/0313436 A1 Oct. 27, 2016

(30) Foreign Application Priority Data

Apr. 21, 2015 (JP) ................. 2015-086838

(51) Int. Cl.
*G01B 11/02* (2006.01)
*G01S 3/786* (2006.01)
(Continued)

(52) U.S. Cl.
CPC .............. *G01S 3/786* (2013.01); *G01B 21/04* (2013.01); *G01S 17/36* (2013.01); *G01S 17/66* (2013.01)

(58) Field of Classification Search
CPC .......... G01S 3/786; G01S 17/36; G01S 17/42; G01S 17/66; G01S 17/74; G01B 11/002; G01B 21/04
See application file for complete search history.

(56) References Cited

U.S. PATENT DOCUMENTS 6,147,748 A 11/2000 Hughes
7,800,758 B1 * 9/2010 Bridges ................ G01B 11/002
356/482

(Continued)

FOREIGN PATENT DOCUMENTS

JP 2603429 B2 1/1997
JP 2010-190634 9/2010

(Continued)

*Primary Examiner* — Michael A Lyons
(74) *Attorney, Agent, or Firm* — Greenblum & Bernstein, P.L.C.

(57) ABSTRACT

When measurement is conducted using a measurement system utilizing a tracking-type laser interferometer, laser light is emitted at a retroreflector, the tracking-type laser interferometer is placed in a tracking state, and a displacement body is displaced to a desired point and a combination of position data of the displacement body at a single desired location and rotation position data of a biaxial rotation mechanism from the tracking-type laser interferometer is stored. When a received light determiner determines that there is an abnormality in an amount of light, the positions of the displacement body and the biaxial rotation mechanism are maintained, and the displacement body and biaxial rotation mechanism are displaced to the respective stored, predetermined positions. When the abnormality in the amount of received light is eliminated after displacement, the tracking-type laser interferometer is placed in the tracking state and measurement is restarted.

6 Claims, 6 Drawing Sheets

(51) Int. Cl.
   *G01B 21/04*   (2006.01)
   *G01S 17/36*   (2006.01)
   *G01S 17/66*   (2006.01)

(56) References Cited

U.S. PATENT DOCUMENTS

| | | |
|---|---|---|
| 8,199,330 B2 | 6/2012 | Hara |
| 9,062,958 B2 * | 6/2015 | Hidaka .............. G01B 9/02041 |
| 2007/0268494 A1 * | 11/2007 | Hara ....................... G01S 17/42 |
| | | 356/498 |
| 2008/0316497 A1 | 12/2008 | Taketomi et al. |
| 2010/0128259 A1 * | 5/2010 | Bridges ................. G01B 11/03 |
| | | 356/138 |
| 2010/0208232 A1 | 8/2010 | Hara |

FOREIGN PATENT DOCUMENTS

| | | |
|---|---|---|
| JP | 4776454 B2 | 7/2011 |
| JP | 5244339 B2 | 4/2013 |

* cited by examiner

MEASUREMENT SYSTEM USING TRACKING-TYPE LASER INTERFEROMETER AND RETURN METHOD OF THE MEASUREMENT SYSTEM

CROSS-REFERENCE TO RELATED APPLICATIONS

The present application claims priority under 35 U.S.C. § 119 of Japanese Application No. 2015-086838, filed on Apr. 21, 2015, the disclosure of which is expressly incorporated by reference herein in its entirety.

BACKGROUND OF THE INVENTION

1. Field of the Invention

The present invention relates to a measurement system using a tracking-type laser interferometer and a return method of the measurement system. In particular, the present invention relates to a measurement system using a tracking-type laser interferometer and a return method of the measurement system which, even when a laser light is interrupted and tracking is no longer possible, is capable of automatically resetting the tracking and restarting measurement.

2. Description of Related Art

Japanese Patent No. 2,603,429, U.S. Pat. No. 6,147,748, and Japanese Patent No. 4,776,454 describe examples of a tracking-type laser interferometer which, while tracking a displacement body, measures displacement and a position of the displacement body with a high degree of accuracy. These tracking-type laser interferometers are used when calibrating a measuring device or a machine tool, and a retroreflector (recursive reflector) is mounted, as a measured body, to a device to be calibrated.

FIG. 1 illustrates an exemplary configuration of a tracking-type laser interferometer. A tracking-type laser interferometer 40 is configured by a retroreflector 42 fixated to a displacement body (object to be measured) 22; an optical measurement device 70; a biaxial rotation device 80; and a control device (hereafter referred to as a rotation mechanism control device) 82 for the biaxial rotation device 80. The biaxial rotation device 80 includes a biaxial rotation mechanism having mutually orthogonal axes, and has an angle detector (not shown in the drawings) on each axis. Laser light 74 is guided from a laser light source 60 to the optical measurement device 70 using an optical fiber 62. The optical measurement device 70 is configured by a laser interferometer (length measurement meter; hereafter, referred to simply as a laser interferometer) 72 measuring a distance L from an origin point O to the retroreflector 42; and an optical device for tracking 76 used in tracking control of the retroreflector 42.

The retroreflector 42 is an optical element in which the optical axes of incident light and reflected light are parallel, and the optical axes of the incident light and reflected light are point symmetrical with respect to the center of the retroreflector 42. Therefore, when the incident light strikes a position away from the reflection center of the retroreflector 42, the reflected light is returned to a position offset with respect to the incident light. The optical device for tracking 76 includes an optical position detector 78 monitoring an amount of offset between the incident light and the reflected light. The optical device for tracking 76 detects the amount of offset and transmits it to the rotation mechanism control device 82.

Using a signal (amount of offset between the incident light and the reflected light) sent from the optical device for tracking 76 and an angle signal output from the angle detectors on each of the rotation axes of the biaxial rotation mechanism, the rotation mechanism control device 82 controls the biaxial rotation device 80 so as to bring the amount of offset within a predetermined range.

The laser interferometer 72 attached to the biaxial rotation device 80, which is configured by a biaxial rotation mechanism (biaxial rotator) having mutually orthogonal axes, causes interference in light returning from the retroreflector 42; includes a detector detecting by phase a change in intensity of the interference light; and treats a rotation center (intersection point) of the biaxial rotation mechanism as the origin point O, and the distance L from the origin point O to the retroreflector 42 is measured via the rotation mechanism control device 82.

With this configuration, in a measurement of the tracking-type (tracking) laser interferometer 40, an angle signal of the biaxial rotation device 80 and distance data (L) observed by the laser interferometer 72 are obtained as measured values. Using these measured values, the tracking-type laser interferometer 40 can be used as a three-dimensional coordinate measurement device.

In addition, by using a plurality of tracking-type laser interferometers, using only the distance data (L) observed by the laser interferometer 72, trilateration for length can be performed and three-dimensional coordinate values can also be calculated.

However, in the tracking-type laser interferometer shown in FIG. 1, the position of the retroreflector 42 may become impossible to track when the laser light 74 is interrupted by an obstacle or the like between the tracking-type laser interferometer main body 50 and the retroreflector 42, or when a surface of the retroreflector 42 is dirty, or for some other reason. In such a case, labor is required in order to restart the measurement, such as a worker going to where the rotation mechanism control device 82 is located and operating the tracking-type laser interferometer main body 50 to fire the laser light 74 at the retroreflector 42, or moving the displacement body 22 (including the retroreflector 42) to the laser light 74 being emitted. In addition, because measurement is stopped partway through, measurement must be conducted once again. Because human beings are involved in this work, environmental changes (such as in temperature) may result. This is not beneficial to highly precise measurements.

Applicant notes that Japanese Patent No. 5,244,339 suggests a fan-shaped laser light be emitted to locate a retroreflector, while Japanese Patent Laid-open Publication No. 2010-190634 suggests scanning a spiraling laser light to locate a retroreflector. However, both of these require additional hardware.

The present invention has been devised in order to resolve the conventional concerns and, even when a laser light is blocked and tracking is no longer possible for a tracking-type laser interferometer using a laser interferometer to measure displacement, tracking can be automatically reset and measurement can be restarted with a simple method, and without additional hardware.

SUMMARY OF THE INVENTION

The present invention provides a measurement system utilizing a tracking-type laser interferometer that includes industrial machinery, a tracking-type laser interferometer, a received light determiner, and a memory. The industrial machinery includes a displacement body displacing relative to an object and a displacement mechanism causing the displacement body to displace relative to the object. The tracking-type laser interferometer includes a retroreflector attached to the displacement body; a detector emitting laser light at the retroreflector and detecting displacement using interference in the laser light reflected in a return direction by the retroreflector; an optical device for tracking having an optical position detector detecting positional drift of an optical axis of the laser light; a biaxial rotation mechanism having mutually orthogonal axes and capable of changing an emitting direction of the laser light; and an angle detector provided to each axis of the biaxial rotation mechanism. The tracking-type laser interferometer is configured such that, when the displacement body is displaced relative to the object by the displacement mechanism, the positional drift of the optical axis of the laser light reflected in the return direction by the retroreflector is detected by the optical position detector and the biaxial rotation mechanism is controlled so as to constrain the positional drift of the optical axis of the laser light within a predetermined range. The received light determiner determines, based on a received light signal of the optical position detector, whether there is an abnormality in an amount of light reflected from the retroreflector. While the displacement body is displaced to a plurality of positions, the memory obtains and stores, at each position, position data of the industrial machinery, a distance from the tracking-type laser interferometer to the retroreflector, and biaxial angular position data for that point in time.

In this example, the control device of the industrial machinery and the control device of the tracking-type laser interferometer can be configured to enable communication with each other.

The present invention also provides a return method of a measurement system utilizing a tracking-type laser interferometer in which, when measurement is conducted using the measurement system utilizing the tracking-type laser interferometer described above, the laser light is emitted at the retroreflector, the tracking-type laser interferometer is placed in a tracking state, and the displacement body is displaced to a desired point and a combination of position data of the displacement body at a single desired location and rotation position data of the biaxial rotation mechanism from the tracking-type laser interferometer is stored. When the received light determiner determines that there is an abnormality in the amount of light, the positions of the displacement body and the biaxial rotation mechanism are maintained, and the displacement body and biaxial rotation mechanism are displaced to the respective stored, predetermined positions. When the abnormality in the amount of received light is eliminated after displacement, the tracking-type laser interferometer is placed in the tracking state and measurement is restarted.

The present invention further provides a return method of a measurement system utilizing a tracking-type laser interferometer in which, when measurement is conducted using the measurement system utilizing the tracking-type laser interferometer described above, the laser light is emitted at the retroreflector, the tracking-type laser interferometer is placed in a tracking state, the displacement body is displaced to a desired point, and a combination of position data of the displacement body at a plurality of desired locations and rotation position data of the biaxial rotation mechanism from the tracking-type laser interferometer is stored. When the received light determiner determines that there is an abnormality in the amount of light, the positions of the displacement body and the biaxial rotation mechanism are maintained, and the displacement body and biaxial rotation mechanism are displaced to the respective stored, predetermined positions. When the amount of received light is still abnormal after displacement, the displacement body and biaxial rotation mechanism are held, then are displaced to a subsequent predetermined position, and displacement is repeated until a predetermined position where the abnormality in the amount of received light is eliminated. When the abnormality in the amount of received light is eliminated after displacement, the tracking-type laser interferometer is placed in the tracking state and measurement is restarted.

According to the present invention, even when tracking is no longer possible due to laser light from the tracking-type laser interferometer being interrupted, for example, tracking can be automatically reset and measurement can be restarted with a simple method, and without additional hardware. Therefore, a tracking return task can be automated, eliminating human intervention and therefore minimizing environmental changes, making possible more highly accurate and stable measurement.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described in detail with reference to the drawings. Moreover, the present invention is not limited by the content described in the embodiments and examples that follow. Configuration requirements in the following embodiments and examples may also include that which is readily conceivable by one skilled in the art, that which is substantially similar, and that which encompasses an equivalent scope. Furthermore, the configuration requirements disclosed in the following embodiments and examples may be combined as appropriate, or may be selectively employed as appropriate.

Figure 1:
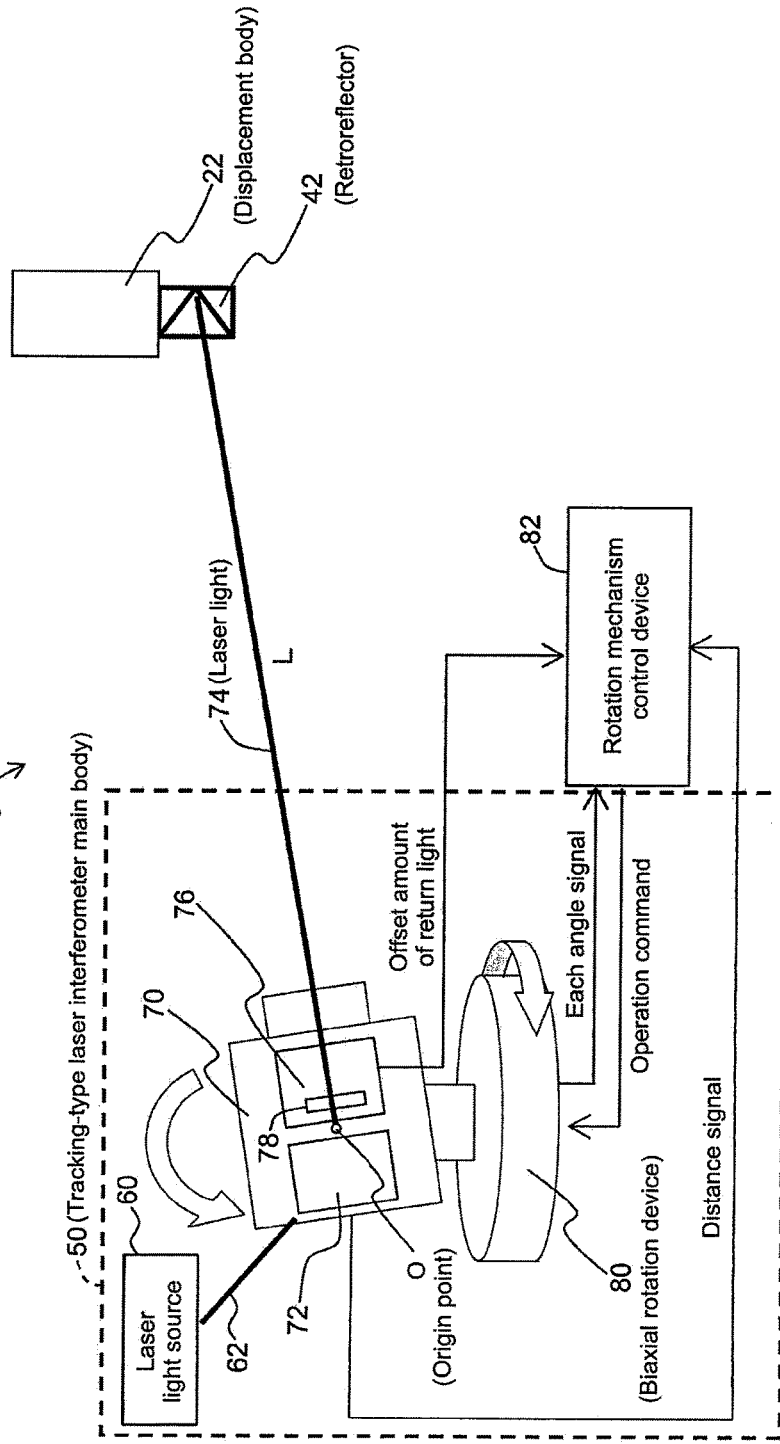
FIG. 1 is a block diagram illustrating an exemplary configuration of a conventional tracking-type laser interferometer.
Figure 2:
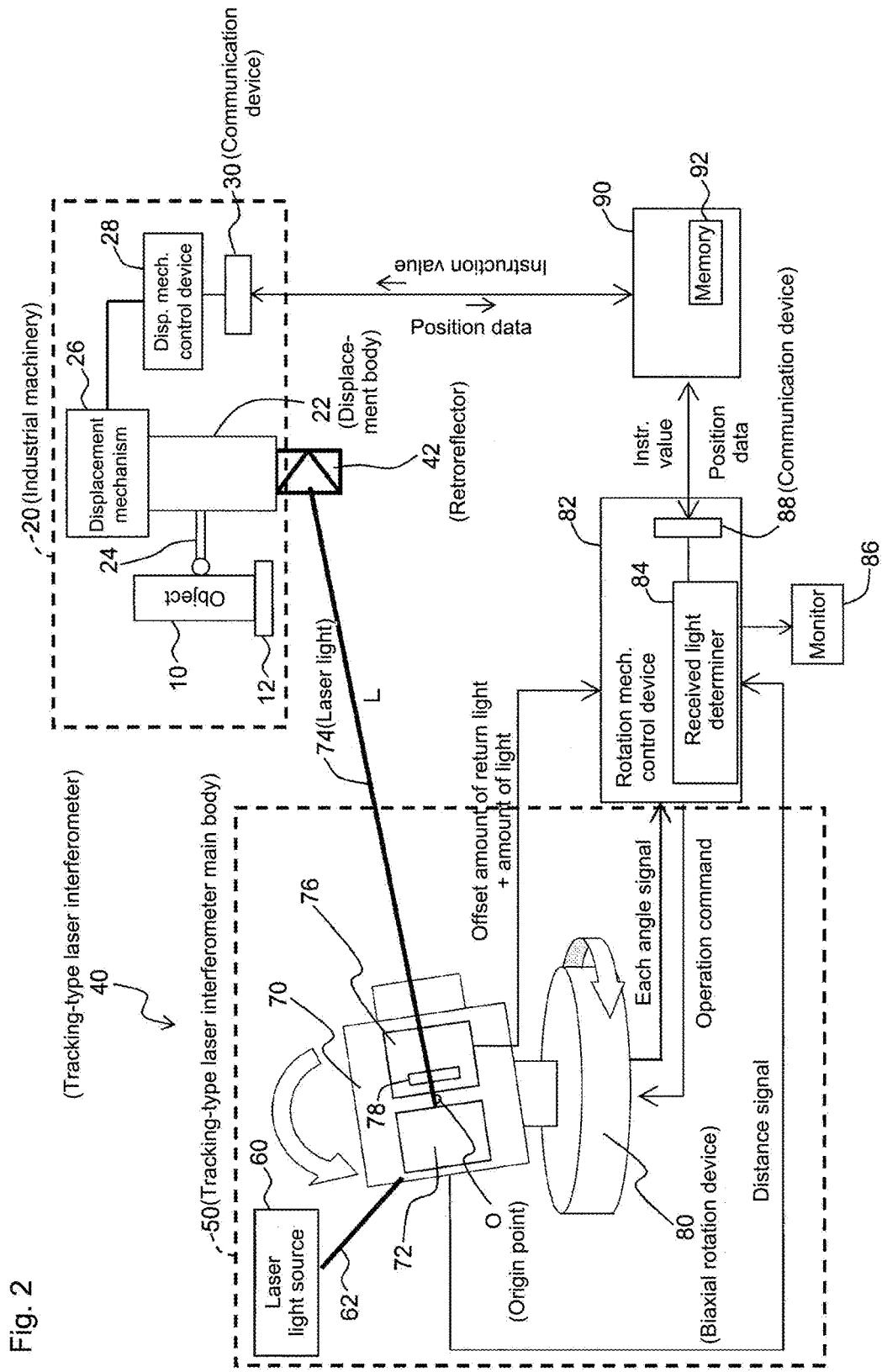
FIG. 2 is a block diagram illustrating a configuration of an embodiment of a measurement system using a tracking-type laser interferometer according to the present invention.

An embodiment of a measurement system using a tracking-type laser interferometer to implement the present invention is shown in FIG. 2.

The present embodiment primarily includes an industrial machine or machinery 20 such as a three-dimensional coordinate measuring device, a machine tool, or the like; a tracking-type laser interferometer 40; and a personal computer (PC) 90.

The industrial machinery 20 includes a displacement body 22 displacing relative to an object (measured object or processed object) 10 mounted on a placement table 12, the displacement body 22 having a stylus head (the stylus head may also be a processing tool for processing the object) 24 attached to measure the object 10; a displacement mechanism (displacer) 26 displacing the displacement body 22 relative to the object 10 by displacing the displacement body 22 or by displacing the placement table 12; a control device (hereafter referred to as a displacement mechanism control device or controller) 28 for the displacement mechanism 26; and a communication device (also referred to as a communicator) 30 outputting an instruction value and position data to an exterior.

The tracking-type laser interferometer 40 includes a retroreflector 42 mounted on the displacement body 22; a tracking-type laser interferometer main body 50; a rotation mechanism control device (rotation mechanism controller) 82; and a monitor 86.

The tracking-type laser interferometer main body 50 includes a laser interferometer (length measurement meter) 72, an optical device for tracking (also referred to as an optical tracker) 76, a biaxial rotation device 80, and an angle detector (not pictured). A rotation mechanism control device 82, a received light determiner 84, a monitor 86, and a communication device 88 are further provided. The laser interferometer 72 emits a laser light 74, guided via an optical fiber 62 from a laser light source 60, toward the retroreflector 42, and detects a distance L from an origin point O to the retroreflector 42 using optical interference of the laser light 74 reflected in a return direction by the retroreflector 42. The optical device for tracking 76 includes an optical position detector 78 detecting positional drift of an optical axis of the laser light 74. The biaxial rotation device 80 includes a biaxial rotation mechanism having mutually orthogonal axes and capable of changing an emitting direction of the laser interferometer 72. The angle detector is provided to each of the rotation axes of the biaxial rotation mechanism. In a case where the displacement body 22 is displaced with respect to the object 10 by the displacement mechanism 26, the rotation mechanism control device 82 detects, using the optical position detector 78, positional drift of the optical axis of the laser light, which is reflected in the return direction by the retroreflector 42 mounted to the displacement body 22, and controls the biaxial rotation mechanism so as to constrain the positional drift of the optical axis of the laser light within a predetermined range. The received light determiner 84 installed within the rotation mechanism control device 82, for example, determines whether there is an abnormality in an amount of light reflected from the retroreflector 42 based on a light reception signal from the optical position detector 78. The monitor 86 displays the determination results. The communication device 88 outputs instruction values and position data to the exterior.

The laser interferometer 72 is configured by providing a photodiode PD, for example.

The optical position detector 78 is configured by providing a four-element segmented photodiode PD or a two-dimensional position-sensitive detector (PSD), for example, and is capable of outputting not only an optical position, but also a total amount of light received.

The PC 90 includes a memory 92 storing position data of the displacement body 22, which is output from the displacement mechanism control device 28 of the industrial machinery 20, and position data of the rotation mechanism, which is output from the rotation mechanism control device 82.

The measurement system displaces the displacement body 22 of the industrial machinery 20 to a plurality of positions and, at each of the positions, the measurement system has position data of the industrial machinery 20, a distance L from the origin point O of the tracking-type laser interferometer 40 to the retroreflector 42, and biaxial angular position data for that point in time, and performs measurement using this data.

In the present embodiment, communications from the displacement mechanism control device 28 and the rotation mechanism control device 82 are received by the PC 90, instruction values and position data are processed, and measurement is conducted. Moreover, in a case where one of the displacement mechanism control device 28 and the rotation mechanism control device 82 is a control device that includes a signal processing ability, the displacement mechanism control device 28 and the rotation mechanism control device 82 can be directly linked for communication and achieve a similar effect.

So long as a communication method is capable of bidirectional communication, a wired communication method such as RS232C, RS422, or USBLAN, or a wireless communication method such as wireless LAN or WiFi may be used.

Figure 3:
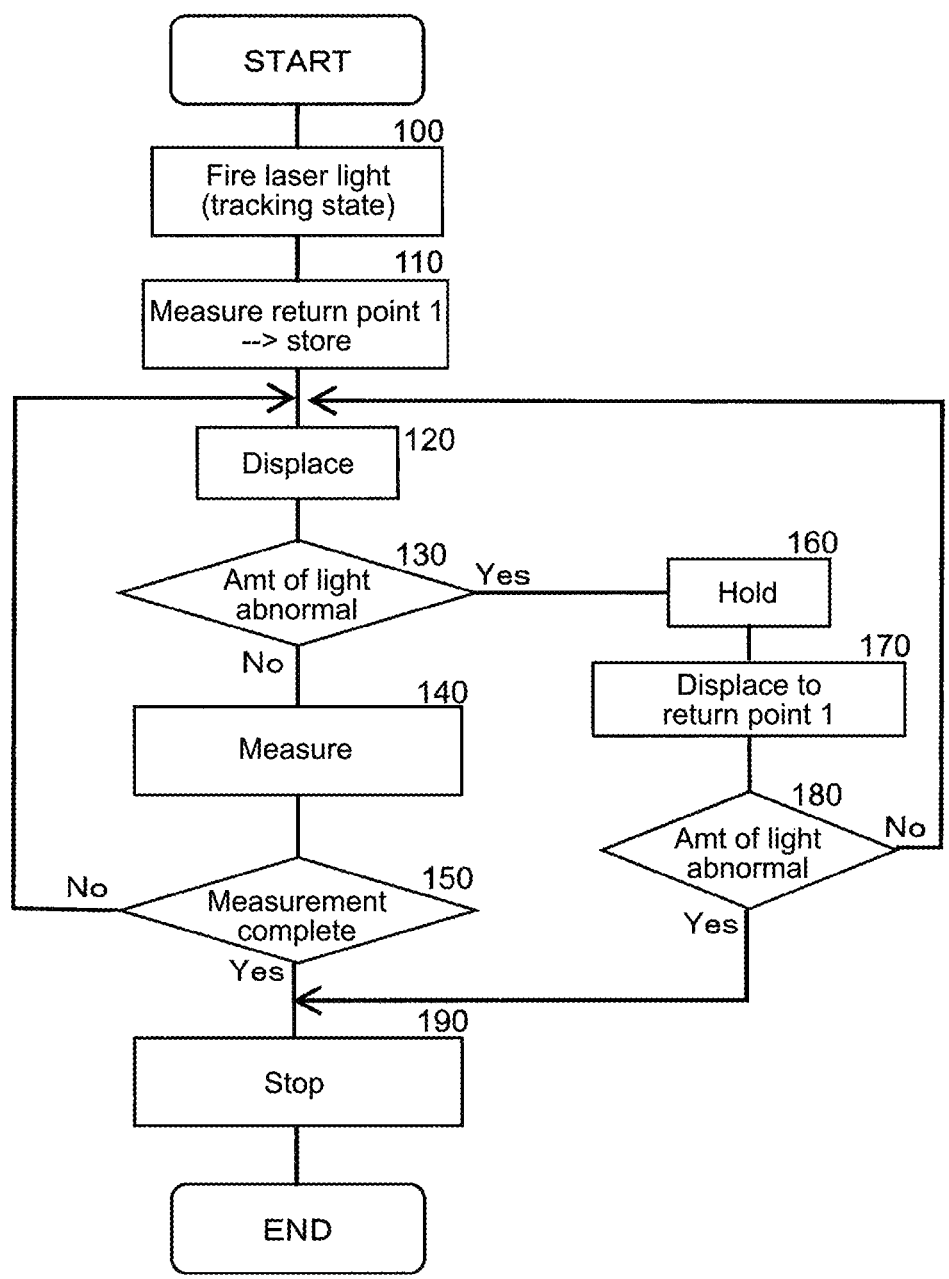
FIG. 3 is a flowchart illustrating a procedural flow according to a first embodiment of a return method according to the present invention.

Hereafter, a first embodiment of a return action of the measurement system shown in FIG. 2 is described with reference to FIG. 3.

First, in step 100, laser light 74 is emitted toward the retroreflector 42 and the tracking-type laser interferometer 40 is placed in a tracking state.

Figure 4:
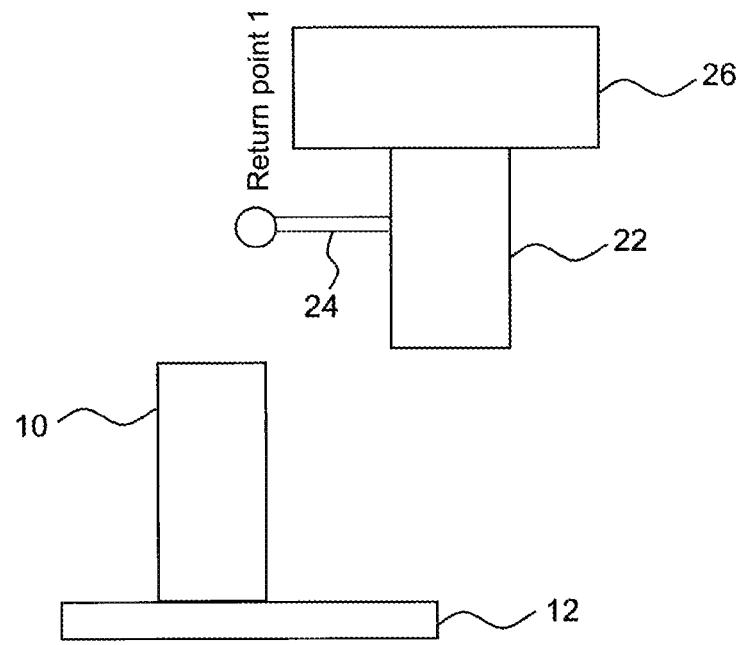
FIG. 4 is a front view illustrating the first embodiment.

Next, in step 110, the displacement body 22 is displaced and, as shown in FIG. 4, data is collected at one desired point. A combination of position data from the industrial machinery 20 and rotation position data of the biaxial rotation device 80 from the tracking-type laser interferometer 40 at this point in time is stored in the memory 92 of the PC 90 as a return point 1. The return point 1 is defined where no obstacle is present in a movement range of the displacement body 22.

Next, advancing to step 120, the displacement body 22 is displaced to a predetermined measurement position and measurement is conducted. At this time, in step 130, a determination is made as to whether an amount of light received by a received light determiner 84 is abnormal. When the amount of light received is not abnormal, measurement is conducted in step 140. When there is no abnormality, these actions are performed until a determination is made in step 150 that measurement is complete, and the process stops at step 190, where the measurement is completed.

Meanwhile, in a case where an abnormality is determined to be present in the amount of light received in step 130, the process advances to step 160 and the positions of the displacement body 22 and tracking-type laser interferometer main body 50 are maintained.

Next, in step 170, the displacement body 22 is displaced to the return point 1 measured in step 110 and the tracking-type laser interferometer main body 50 is also displaced to the position of the return point 1 in the rotation position data.

Next, the process advances to step 180 and a determination is made as to whether the abnormality in the amount of received light has been eliminated. In a case where the abnormality in the amount of received light has been resolved, the system enters a state where tracking is enabled, and the process returns to step 120 and restarts measurement.

Figure 5:
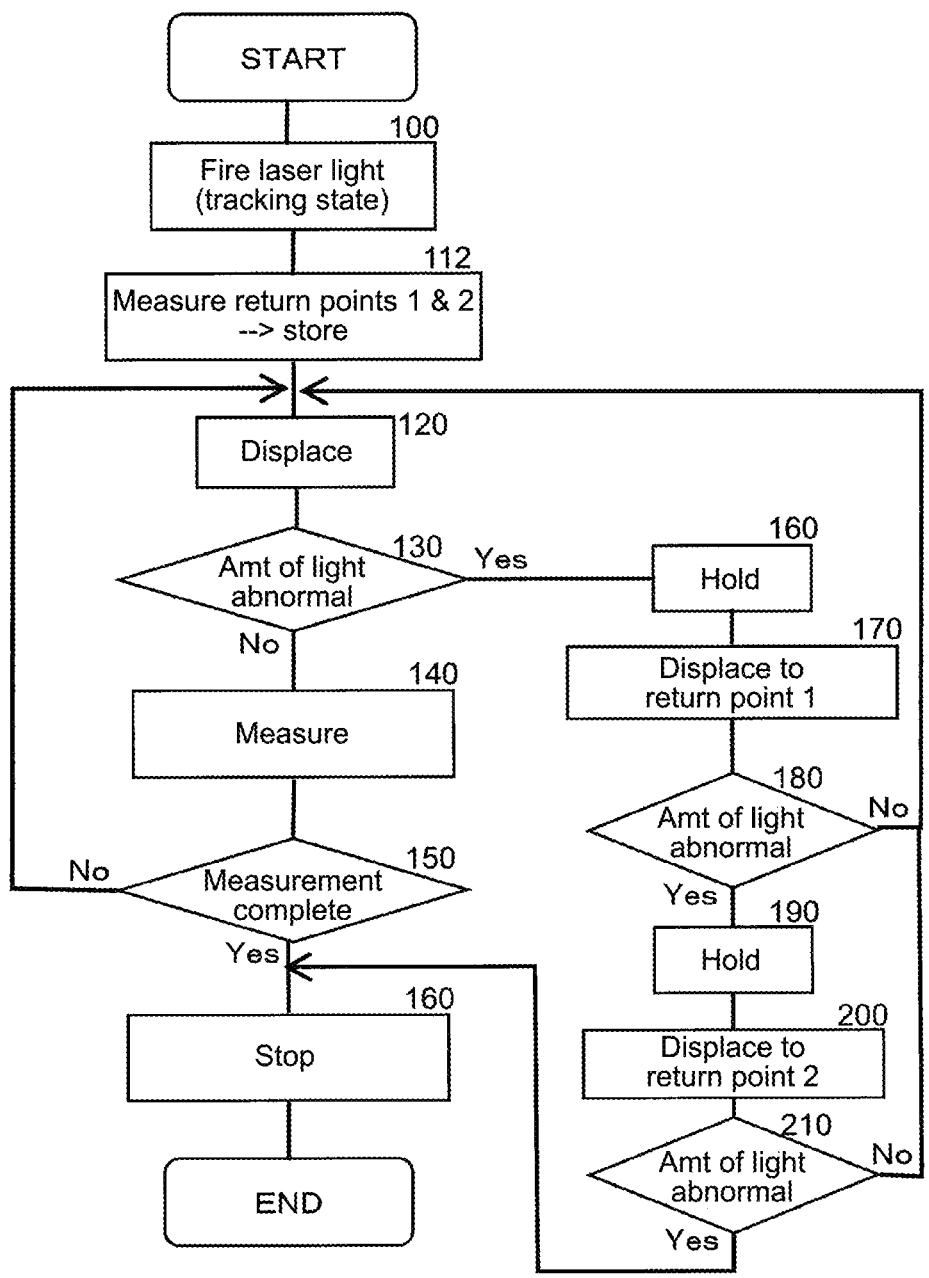
FIG. 5 is a flowchart illustrating a procedural flow according to a second embodiment of a return method according to the present invention.

Hereafter, a second embodiment of the return action is described with reference to FIG. 5.

In step 100, which is similar to that of the first embodiment, laser light 74 is emitted toward the retroreflector 42 and the tracking-type laser interferometer 40 is placed in a tracking state.

Figure 6:
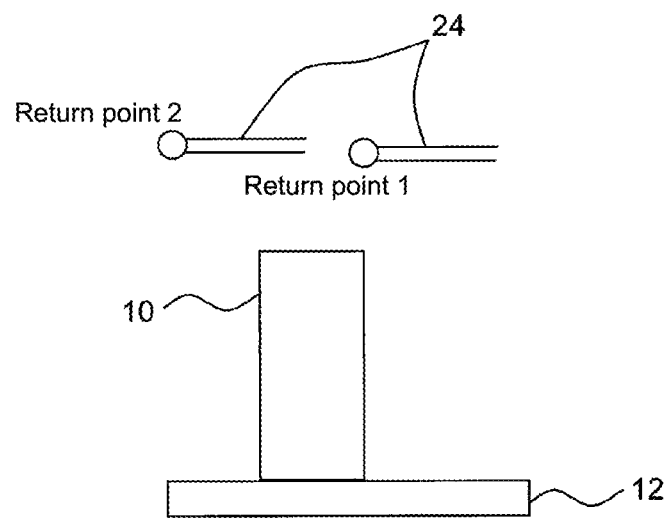
FIG. 6 is a front view illustrating the second embodiment.

Next, the process advances to step 112 and, as shown in FIG. 6, the displacement body 22 is displaced to a plurality of desired points, and a combination of position data for the displacement body 22 at this plurality of desired points and rotation position data of the biaxial rotation device 80 from the tracking-type laser interferometer 40 is stored in the memory 92 of the PC 90 as a plurality of return points 1 . . . N (in this example, N=2). The return points 1 and 2 are defined where no obstacle is present in the movement range of the displacement body 22.

Next, in step 120, the displacement body 22 is displaced to a predetermined measurement position, and when there is no abnormality in the amount of light received, measurement is conducted in step 140, and the process repeats until measurement is completed in step 150, and stops in step 160.

Meanwhile, in a case where an abnormality is determined to be present in the amount of light received in step 130, the process advances to step 160 and the positions of the displacement body 22 and tracking-type laser interferometer main body 50 are maintained.

Next, in step 170, the displacement body 22 and the biaxial rotation device 80 are displaced to the stored return point 1, and in a case where, in step 180, the abnormality in the amount of received light has been resolved, the process returns to step 120 and restarts measurement.

Meanwhile, when a determination is made in step 180 that there is still an abnormality in the amount of received light even when the displacement body 22 and the biaxial rotation device 80 are displaced to the return point 1, that state is maintained in step 190 and, in step 200, the displacement body 22 and the biaxial rotation device 80 are displaced to the subsequent return point 2, and this is repeated until the abnormality in the amount of received light is eliminated in step 210.

When the abnormality in the amount of received light has been resolved in this way and the system has entered a state where tracking is enabled, the process returns to step 120 and restarts measurement.

The industrial machinery 20 is not limited to a three-dimensional coordinate measuring device, and can be any industrial machinery such as another measuring device, a machine tool, or the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measurement system comprising:
   an industrial machine comprising:
      a retroreflector configured to receive laser light transmitted from a tracking laser interferometer; and
      a displacement body attached to the retroreflector and configured to be moved relative to an object while the retroreflector receives the laser light, the displacement body including a stylus head to measure the object;
      a control device including a processor and configured to control the displacement body to move relative to the object; and
      a first communication device configured to transmit, while the retroreflector receives the laser light, position data corresponding to a position of the displacement body to a memory;
   a tracking laser interferometer main body comprising:
      a laser interferometer configured
         to emit laser light at the retroreflector, and
         to detect a length of the laser light from the laser interferometer to the retroreflector using interference in the laser light reflected in a return direction by the retroreflector;
      an optical tracker including an optical position detector configured to detect positional drift of an optical axis of the laser light in response to a movement of the displacement body;
      a biaxial rotator having two axes of rotation and configured to independently rotate along the two axes to change a emitting direction of the laser light;
      a first angle detector configured to detect a first angle of rotation at a first axis of the two axes of rotation;
      a second angle detector configured to detect a second angle of rotation at a second axis of the two axes of rotation; and
      a second communication device configured to transmit, to the memory, the first angle of rotation and the second angle of rotation of the biaxial rotator;
   a received light determining processor configured to determine, based on a received light signal by the optical position detector, a presence of abnormality in an amount of light reflected from the retroreflector; and
   the memory configured to store a target combination of position data corresponding to a target position of the displacement body, a target angle of the first angle of rotation, and a target angle of the second angle of rotation at which target amount of light is reflected by the retroreflector before the presence of abnormality is determined,
   wherein, when the presence of abnormality in the amount of light reflected from the retroreflector is detected, and a value of the positional drift of the optical axis of the laser light is configured to be controlled within a predetermined range, the biaxial rotator is controlled to adjust at least one of the first angle of rotation and the second angle of rotation to constrain the positional drift of the optical axis of the laser light within the predetermined range, and wherein, when the presence of abnormality in the amount of light reflected from the retroreflector is detected, and when the value of the positional drift of the optical axis of the laser light is outside of the predetermined range, the target combination of the position data of the target position of the displacement body, the target angle of the first angle of rotation, and the target angle of the second angle of rotation is retrieved from the memory, and the displacement body and the biaxial rotator are controlled to reposition the displacement body and the biaxial rotator in accordance with the target combination of the target position of the displacement body, the target angle of the first angle, and the target angle of the second angle of rotation to reposition the retroreflector to reflect the target amount of light.

2. The measurement system according to claim 1, wherein the position data corresponding to the target position of the displacement body, the target angle of the first angle of rotation of the biaxial rotator, and the target angle of the second angle of rotation of the biaxial rotator are related to another to provide a target position of the laser light with respect to the optical axis at which the target amount of light is reflected from the retroreflector.

3. A return method of a measurement system, wherein, when a measurement of an object is conducted using the measurement system utilizing the tracking laser interferometer according claim 1, the method comprises:

emitting the laser light at the retroreflector for placing the tracking laser interferometer in a tracking state;

moving the displacement body to the target position;

storing, in the memory, the target combination of target position data of the displacement body, the target angle of the first angle of rotation of the biaxial rotator, and the target angle of the second angle of rotation of the biaxial rotator, each of which corresponds to the target position of the displacement body;

when the presence of abnormality in the amount of light is determined, retrieving, from the memory, the target combination of the target position of the displacement body, the target angle of the first angle of rotation, and the target angle of the second angle of rotation, and repositioning the displacement body and the biaxial rotator in accordance with the retrieved information; and when the abnormality in the amount of received light is eliminated after the repositioning of the displacement body and the biaxial rotator, the tracking laser interferometer is again placed in the tracking state and measurement is restarted.

4. A return method of a measurement system, wherein, when a measurement is conducted using the measurement system utilizing the tracking laser interferometer according claim 2, the method comprises:

emitting the laser light at the retroreflector for placing the tracking laser interferometer in a tracking state; and moving the displacement body to the target position;

storing, in the memory, the target combination of target position data of the displacement body, the target angle of the first angle of rotation of the biaxial rotator, and the target angle of the second angle of rotation of the biaxial rotator, each of which corresponds to the target position of the displacement body;

when the presence of abnormality in the amount of light is determined, retrieving, from the memory, the target combination of the target position of the displacement body, the target angle of the first angle of rotation, and the target angle of the second angle of rotation, and repositioning the displacement body and the biaxial rotator in accordance with the retrieved information; and when the abnormality in the amount of received light is eliminated after the repositioning of the displacement body and the biaxial rotator, the tracking laser interferometer is placed again in the tracking state and measurement is restarted.

5. A return method of a measurement system, wherein, when a measurement of an object is conducted using the measurement system utilizing the tracking laser interferometer according to claim 1, the method comprises:

emitting the laser light at the retroreflector for placing the tracking laser interferometer in a tracking state;

moving the displacement body to the target position;

storing, in the memory, the target combination of target position data of the displacement body, the target angle of the first angle of rotation of the biaxial rotator, and the target angle of the second angle of rotation of the biaxial rotator, each of which corresponds to the target position of the displacement body;

when the presence of abnormality in the amount of light is determined, retrieving, from the memory, the target combination of the target position of the displacement body, the target angle of the first angle of rotation, and the target angle of the second angle of rotation, and repositioning the displacement body and the biaxial rotator in accordance with the retrieved information; and when the amount of received light is determined to be abnormal still after the repositioning, positioning the displacement body and biaxial rotator to a subsequent predetermined combination of a subsequent position of the displacement body, a subsequent angle of the first angle of rotation, and a subsequent angle of the second angle of rotation, and positioning the displacement body and biaxial rotator to different predetermined combinations of positions of the displacement body, angles of the first angle of rotation, and angles of the second angle of rotation, until the displacement body and biaxial rotator are positioned where the abnormality in the amount of received light is determined to be eliminated, and when the abnormality in the amount of received light is determined to be eliminated, the tracking laser interferometer is again placed in the tracking state and measurement is restarted.

6. A return method of a measurement system, wherein, when a measurement is conducted using the measurement system utilizing the tracking laser interferometer according to claim 2, the method comprises:

emitting the laser light at the retroreflector for placing the tracking laser interferometer in a tracking state;

moving the displacement body to the target position;

storing, in the memory, the target combination of target position data of the displacement body, the target angle of the first angle of rotation of the biaxial rotator, and the target angle of the second angle of rotation of the biaxial rotator, each of which corresponds to the target position of the displacement body;

when the presence of abnormality in the amount of light is determined,
  retrieving, from the memory, the target combination of the target position of the displacement body, the target angle of the first angle of rotation, and the target angle of the second angle of rotation, and
  repositioning the displacement body and the biaxial rotator in accordance with the retrieved information; and when the amount of received light is determined to be abnormal still after the repositioning,
  positioning the displacement body and biaxial rotator to a subsequent predetermined combination of a subsequent position of the displacement body, a subsequent angle of the first angle of rotation, and a subsequent angle of the second angle of rotation, and
  positioning the displacement body and biaxial rotator to different predetermined combinations of positions of the displacement body, angles of the first angle of rotation, and angles of the second angle of rotation, until the displacement body and biaxial rotator are positioned where the abnormality in the amount of received light is determined to be eliminated, and when the abnormality in the amount of received light is determined to be eliminated, the tracking laser interferometer is again placed in the tracking state and measurement is restarted.

* * * * *